(12) United States Patent
Heren et al.

(10) Patent No.: US 8,684,472 B2
(45) Date of Patent: Apr. 1, 2014

(54) BRAKING SYSTEMS, AND MORE PARTICULARLY HYDRAULIC BRAKING SYSTEMS FOR FARM VEHICLES

(75) Inventors: Jean A Heren, Verberie (FR); Romain Gostomski, Verberie (FR); Dominique P Costaz, Verberie (FR); Fablen A Roger, Verberie (FR)

(73) Assignee: Poclain Hydraulics Industrie, Verberie (FR)

( * ) Notice: Subject to any disclaimer, the term of this patent is extended or adjusted under 35 U.S.C. 154(b) by 203 days.

(21) Appl. No.: 13/231,828

(22) Filed: Sep. 13, 2011

(65) Prior Publication Data

US 2012/0062022 A1    Mar. 15, 2012

(30) Foreign Application Priority Data

Sep. 14, 2010 (FR) ..................... 10 57316

(51) Int. Cl.
*B60T 17/04* (2006.01)
*B60T 11/21* (2006.01)
*B60T 15/04* (2006.01)

(52) U.S. Cl.
USPC ............................. 303/2; 303/9.62

(58) Field of Classification Search
USPC .......... 303/2, 9.62, 13–15, 116.1, 115.1, 123, 303/9.61; 701/70
See application file for complete search history.

(56) References Cited

U.S. PATENT DOCUMENTS

| | | | |
|---|---|---|---|
| 6,217,128 B1 * | 4/2001 | Tillman, Jr. .................. | 303/9.61 |
| 2009/0071778 A1 * | 3/2009 | Cadeddu et al. .............. | 188/345 |
| 2009/0250997 A1 * | 10/2009 | Mamei et al. .............. | 303/117.1 |
| 2011/0018338 A1 * | 1/2011 | Grepl et al. ................ | 303/113.2 |

FOREIGN PATENT DOCUMENTS

| | | |
|---|---|---|
| EP | 1 028 044 A1 | 8/2000 |
| EP | 2 008 897 A2 | 12/2008 |
| WO | WO 2008/001208 | 1/2008 |

* cited by examiner

*Primary Examiner* — Anna Momper
(74) *Attorney, Agent, or Firm* — Blakely Sokoloff Taylor & Zafman LLP

(57) ABSTRACT

This invention discloses a hydraulic braking system (1) for a vehicle comprising:
two pressure supply means (2, 3),
two rear braking means (4, 5) and one front braking means (6),
said hydraulic system (1) being characterised in that it comprises a rear inlet distributor (12), a front inlet distributor (13), a first brake distributor (10) and a second brake distributor (11), defining
a standby configuration,
three braking configurations pressurising:
a first rear brake,
a second rear brake,
the two rear brakes and the front brake respectively,
pressure for the front axle braking means (6) being applied through the front inlet distributor (13), the first brake distributor (10) and the second brake distributor (11).

8 Claims, 4 Drawing Sheets

Figure 1:
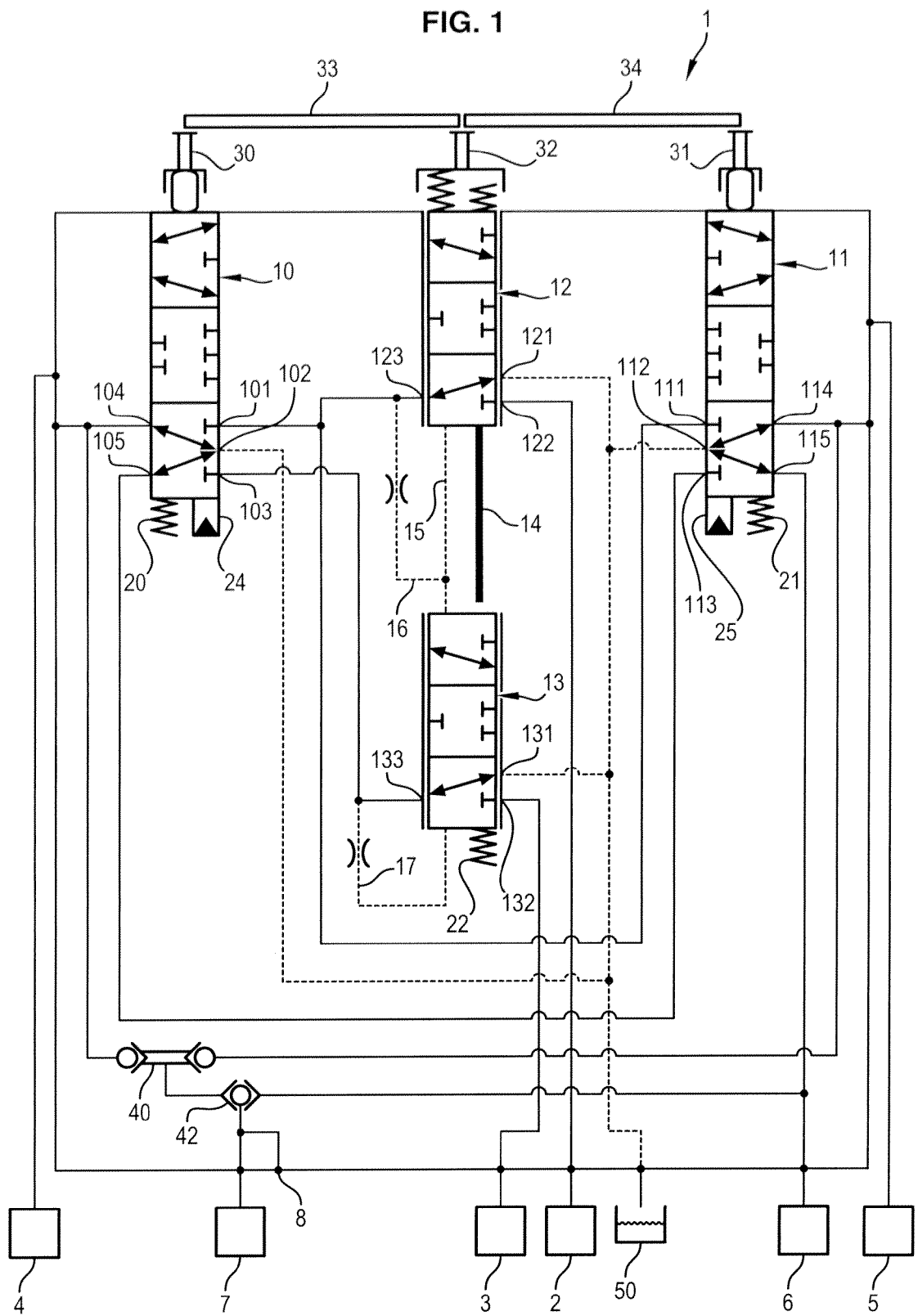

BRAKING SYSTEMS, AND MORE PARTICULARLY HYDRAULIC BRAKING SYSTEMS FOR FARM VEHICLES

GENERAL TECHNICAL FIELD

This invention relates to the field of hydraulic braking systems, and more particularly hydraulic braking systems for farm vehicles.

STATE OF PRIOR ART

Farm vehicles such as tractors need to move around under conditions that are very different, varying from fields to roads.

These conditions are associated with very different travel speeds, and very different braking problems.

During displacement on terrain such as a field, the vehicle moves at low speed and it can brake easily. Furthermore, the available space for turns may be very much reduced, such that the vehicle must be able to pivot around one of its wheels.

On the other hand, farm vehicles can reach relatively high speeds under road conditions which makes efficient braking difficult, particularly due to their high inertia and particularly when the vehicle is going downhill.

Conventional braking solutions for farm vehicles use two distinct brake pedals, each controlling braking on one of the vehicle's driving wheels. Thus in the case of a tractor, a first brake pedal will control braking of the right rear wheel, and a second brake pedal will control braking of the left rear wheel.

Thus, when the vehicle is moving in a field, or more generally when the vehicle is in working condition, the user can apply a single rear brake so that the vehicle can pivot around the braked wheel.

Under road conditions, the user presses the two brake pedals at the same time, which can be facilitated by placing a connection bar between the two brake pedals that the user firstly puts into position before starting to drive on the road.

However, these solutions have several disadvantages. The resulting braking may be insufficient, particularly when the vehicle is on a gradient.

Furthermore, conventional systems use distinct pressure supply sources to supply braking means on each of the vehicle's rear wheels; therefore there is a risk of unbalance during braking, even if the two brake pedals are pressed simultaneously.

Document WO 2008/001208 describes an approach to solving these problems, and discloses a hydraulic braking system for a farm vehicle that can alternate between:

A working configuration in which case the braking of the rear wheels is controlled independently by two brake pedals, the braking means of each wheel each being supplied by a distinct pressure supply source; therefore, the system comprises two distinct pressure supply sources. If the two brake pedals are pressed simultaneously, each of the rear wheels is braked under the action of a distinct pressure supply source, and the front wheels are braked under the combined effect of these two pressure supply sources.

A road position, or more generally a high speed displacement position, in which one of the pressure supply sources applies pressure to the braking means of the two rear wheels, and the other of the pressure supply sources applies pressure to the front wheel braking means.

The user selects the command that will control a distributor to alternate between the working configuration and the road configuration.

However, this hydraulic braking system has disadvantages. The addition of controls to change from the working configuration to the road configuration makes it necessary for the user to perform an additional action, which causes a risk in the case of high speed traffic if the road configuration is not selected. Such components also increase the cost of the braking system.

Furthermore, vehicle braking is severely affected if one of the pressure supply sources fails.

Finally, this hydraulic braking system may be insufficient in the case of a trailer or an auxiliary hitched to the vehicle, since a complete independent braking system will be necessary.

PRESENTATION OF THE INVENTION

This invention is designed to solve these disadvantages and it proposes a hydraulic braking system for a vehicle comprising a front axle and a rear axle, said braking system comprising:
  a first and a second pressure supply means,
  braking means comprising:
    a first rear axle braking means,
    a second rear axle braking means,
    a front axle braking means,
  said hydraulic system being characterised in that it comprises a rear inlet distributor, a front inlet distributor, a first brake distributor and a second brake distributor, defining
    a standby configuration, in which there is no supply to any of the braking means;
    a first braking configuration, in which the first supply means applies pressure to the first braking means of the rear axle;
    a second braking configuration in which the first supply means applies pressure to the second braking means of the rear axle;
    a third braking configuration, in which the first supply means applies pressure to the first and second rear axle braking means, and the second supply means applies pressure to the front axle braking means,
  the pressure in the front axle braking means being applied by the second pressure supply means through the front inlet distributor, the first brake distributor and the second brake distributor.

According to one variant, the system comprises two brake pedals that are pressed by the user applying pressure, and the standby configuration is the position that the system occupies when no pressure is applied to the brake pedals, the first braking configuration is triggered by applying pressure on one of said brake pedals, the second braking configuration is triggered by pressure on the other of said brake pedals, and the third braking configuration is triggered by simultaneously pressing on the two brake pedals.

According to another variation, in its third configuration, either the first or the second supply means applies pressure to an auxiliary braking means.

According to one particular embodiment of this variant, only the means with the highest pressure among the first and second pressure supply means applies pressure to the auxiliary braking means, such that the braking pressure of the auxiliary braking means is greater than or equal to the braking pressure of the front axle braking means.

According to one variant, said front inlet distributor is slaved in displacement relative to the displacement of the rear inlet distributor through mechanical and hydraulic connection means.

According to one particular embodiment of this variant, said hydraulic connection means include a slaving line supplied with pressure through a conduit connected to the rear supply distributor, and said mechanical connection means comprise a thrust rod adapted so that it only moves the front inlet distributor if the hydraulic connection means are defective.

According to another variant, each of said first and second pressure supply means comprises at least one accumulator.

According to one variant, said distribution means comprise a rear inlet distributor, a front inlet distributor, a first brake distributor and a second brake distributor, in which:
 the rear inlet distributor comprises:
  an input connected to the first pressure supply means, and
  an output connected to the first and second brake distributor;
 the front inlet distributor comprises:
  an input connected to the second pressure supply means, and
  an output connected to the first brake distributor;
 the first brake distributor comprises:
  a first input connected to the output of the rear inlet distributor,
  a second input connected to the output of the front inlet distributor,
  a first output connected to the first rear axle braking means,
  a second output connected to the second brake distributor;
 the second brake distributor comprises:
  a first input connected to the output of the rear inlet distributor,
  a second input connected to the second output of the first brake distributor,
  a first output connected to the second rear axle braking means,
  a second output connected to the front axle braking means;

According to one particular embodiment of this variant, each of said distributors has a cut-out position in which each output is connected to a reservoir at atmospheric pressure and each input is closed, and a cut-in position in which
 the input of the rear inlet distributor is connected to its output;
 the input of the front inlet distributor is connected to its output;
 the first input of the first brake distributor is connected to its first output and its second input is connected to its second output;
 the first input of the second brake distributor is connected to its first output and its second input is connected to its second output.

According to one example of this particular embodiment,
 in its standby configuration, each of said distributors is in the cut-out position;
 in its first braking configuration, the rear inlet distributor, the front inlet distributor and the first brake distributor are in the cut-in position, while the second brake distributor is in the cut-out position;
 in its second braking configuration, the rear inlet distributor, the front inlet distributor and the second brake distributor are in the cut-in position, while the first brake distributor is in the cut-out position;
 in its third braking configuration, the rear inlet distributor, the front inlet distributor, the first brake distributor and the second brake distributor are in the cut-in position.

PRESENTATION OF THE DRAWINGS

Figure 2:
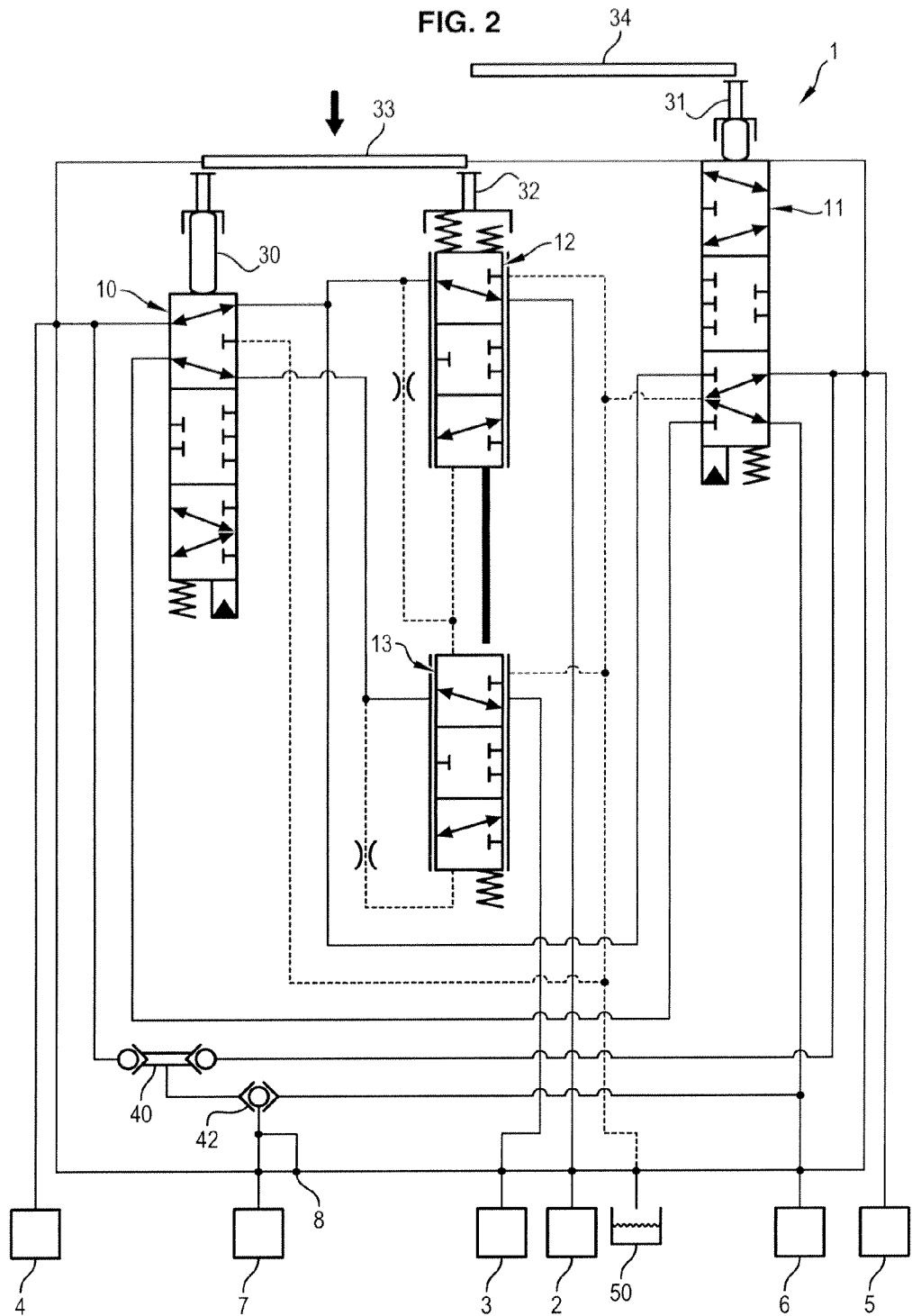
Figure 3:
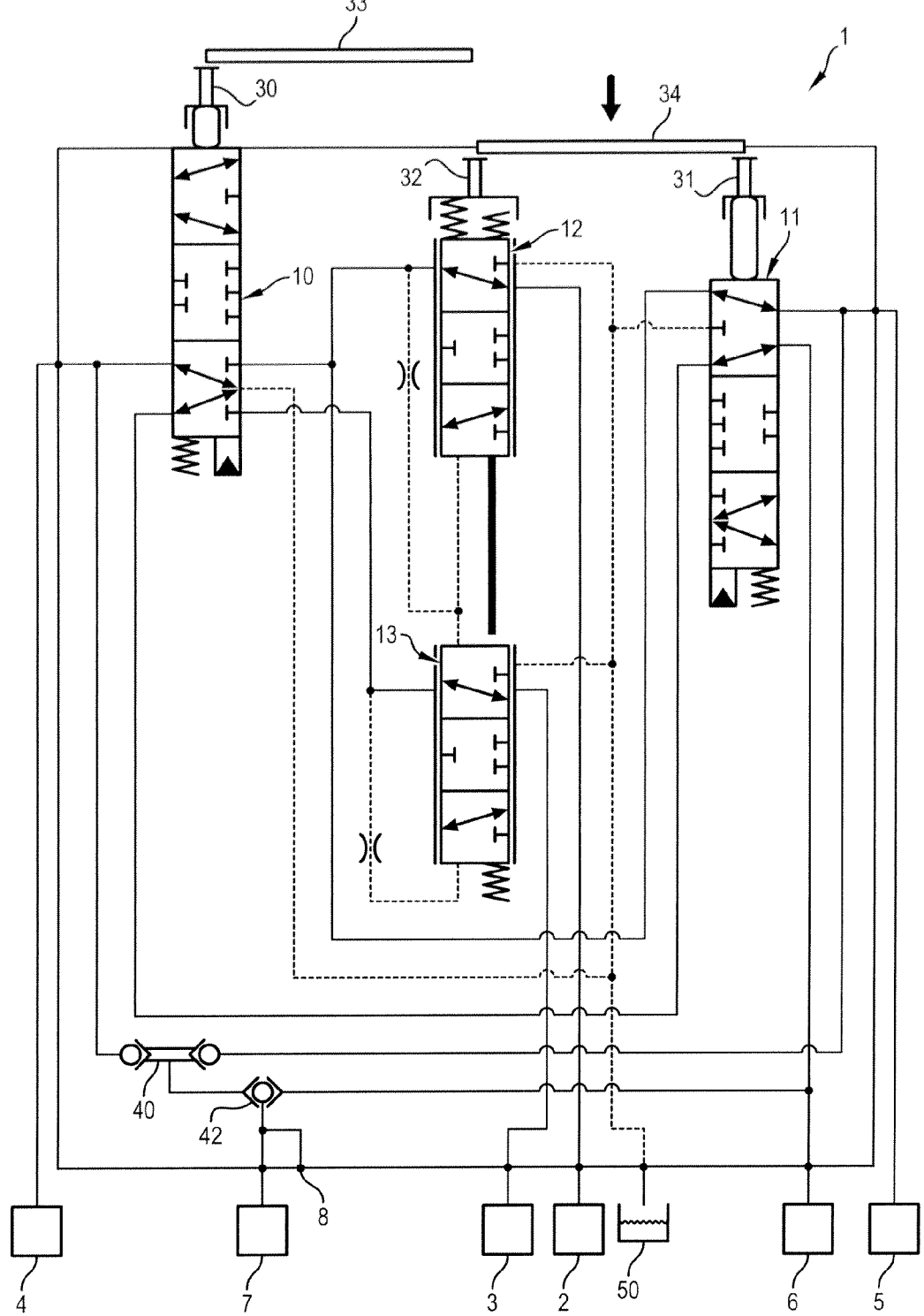
Figure 4:
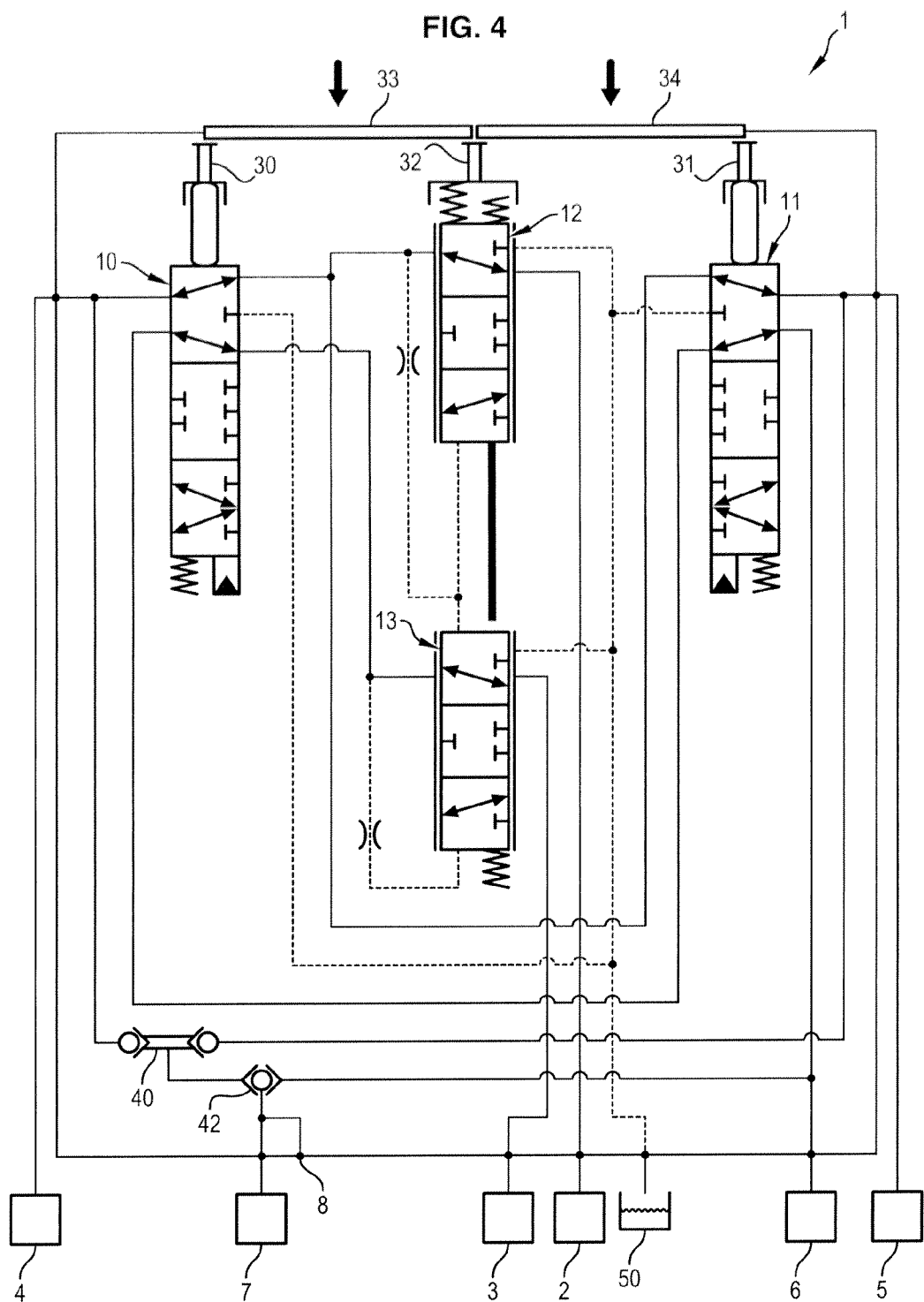

Other characteristics, purposes and advantages of the invention will become clear from the description given below that is purely illustrative and non-limitative and that should be read with reference to the appended drawings among which:
 FIG. 1 shows a hydraulic braking system according to the invention in its standby position,
 FIGS. 2, 3 and 4 show this hydraulic braking system in three braking configurations.

DETAILED DESCRIPTION

FIG. 1 shows a particular embodiment of the hydraulic braking system 1 according to the invention in a standby configuration.

This hydraulic braking system 1 is typically mounted on a vehicle with rear driving wheels, the right and left rear wheels being mounted on separate axles.

This hydraulic braking system 1 comprises:
 two pressure supply sources, 2 and 3 respectively,
 two rear brakes: a right rear brake 4 and a left rear brake 5, which brake the right rear wheel and the left rear wheel of the vehicle respectively;
 front braking means 6 of a front axle;
 auxiliary braking means 7, typically braking means of a trailer or hitch;
 distribution means 10, 11, 12 and 13 that will be described below,
 actuation means 20, 21, 22, that the user uses to actuate the distribution means,
 hydraulic connection elements, making the link between the different components of the hydraulic braking system 1.

In the variant shown in FIG. 1, the hydraulic braking system 1 also comprises a pressure plug 8, such a pressure plug typically being connected to a manometer or a pressure switch, or for example being used to switch the lights on.

The distribution means 10, 11, 12 and 13 as shown are distributors that can alternate between three positions.

The first brake distributor 10 has five orifices 101, 102, 103, 104 and 105.

In the first position of the first brake distributor 10 that will be qualified as the "standby position", the first orifice 101 and the third orifice 103 are closed, while the second orifice 102 is connected to the fourth orifice 104 and the fifth orifice 105 at the same time.

In its second position that will be qualified as the "closed position", all orifices in the first brake distributor 10 are closed.

In its third position that will be qualified as the "braking position", the first orifice 101 of the first brake distributor 10 is connected to the fourth orifice 104, the second orifice 102 is closed and the third orifice 103 is connected to the fifth orifice 105.

Similarly, the other distributors 11, 12 and 13 each have three positions that will be qualified as the standby position, the closed position and the braking position.

The second brake distributor 11 is similar to the first brake distributor 10 presented above; it comprises five orifices 111, 112, 113, 114 and 115.

In the standby position, the first orifice 111 and the third orifice 113 are closed, while the second orifice 112 is connected to the fourth orifice 114 and to the fifth orifice 115.

In the closed position, all orifices 111, 112, 113, 114 and 115 are closed.

In the braking position, the first orifice 111 is connected to the fourth orifice 114, the third orifice 113 is connected to the fifth orifice 115, and the second orifice 112 is closed.

The rear inlet distributor 12 comprises three orifices 121, 122 and 123.

In its standby configuration, the first orifice 121 is connected to the third orifice 123, while the second orifice 122 is closed.

In its closed configuration, all orifices 121, 122 and 123 are closed.

In its braking configuration, the first orifice 121 is closed, while the second orifice 122 is connected to the third orifice 123.

The front inlet distributor 13 is identical to the rear inlet distributor 12 and it comprises three orifices 121, 132 and 133.

In its standby configuration, the first orifice 131 is connected to the third orifice 133, while the second orifice 132 is closed.

In its closed configuration, all orifices 131, 132 and 133 are closed.

In its braking configuration, the first orifice 131 is closed while the second orifice 132 is connected to the third orifice 133.

By default, the distributors 10, 11, 12 and 13 are held in their standby position by elastic means such as springs 20, 21 and 23 respectively for distributors 10, 11 and 13. Due the connection between distributors 12 and 13, by default the elastic means 23 also hold the rear inlet distributor 12 in the standby position. The elastic means may be coupled to actuators; in the embodiment shown, each of the elastic means 20 and 21 are coupled to an actuator 24 and 25 respectively.

The system also comprises control means 30, 31 and 32 controlling the displacement of distributors 10, 11 and 12 respectively. These control means change the position of the distributors 10, 11 and 12, typically by applying pressure on the control means.

Distributors 12 and 13 are connected to each other through a double connection comprising a mechanical connection means 14 and a hydraulic connection means 15, which connects them in displacement. Thus, these two distributors will both be in the same position (standby, closed or braking position).

In the hydraulic system 1 as it is shown in the figures, the distributors 12 and 13 are proportional hydraulic distributors, the position of which is defined by an equilibrium between the forces applied to the ends of these distributors, to enable regulation of their position.

When at least one of the rear braking means 4 or 5 is supplied with pressure by the first pressure supply means 2, the hydraulic connection 15 between the distributors 12 and 13 is also supplied with pressure through the conduit 16 that is connected to the output 123 of the rear supply distributor 12, which will cause a displacement of the front supply distributor 13 similar to the displacement of the rear supply distributor 12.

The mechanical connection means 14 is typically a thrust rod, configured so as to not drive the front supply distributor 13 except when there is insufficient pressure in the hydraulic connection means 15, for example by being sized so that it is shorter than the distance separating the distributors 12 and 13 so that it will not be in contact with these two distributors if there is a supply to the hydraulic connection 15, and thus acts as a safety device if there is a failure in the hydraulic connection 15.

The output 133 from the front supply distributor 13 is connected to a return conduit 17, which works in combination with an elastic return means 22 to bring the rear supply distributor 13 back to its standby configuration when the user stops applying pressure on the control means 32.

As shown, the conduits 16 and 17 are provided with flow limiters to control the applied pressure.

Thus with this specific configuration of distributors 12 and 13, pressure can be applied to the circuit through two distinct pressure supply means 2 and 3 for which displacement relative to each other is slaved.

In practice, the control means are connected in pairs, and correspond to the vehicle brake pedals.

Thus, control means 30 and 32 are simultaneously activated by the vehicle right brake pedal 33, while control means 31 and 32 are simultaneously activated by the vehicle left brake pedal 34. Therefore simultaneous pressure on the two vehicle brake pedals will activate the three controls 30, 31 and 32.

Application of pressure on brake pedals 33 and 34 is represented by an arrow in the figures.

The first pressure supply means 2 is typically an accumulator to supply a predetermined pressure.

This first pressure supply means is connected to the second orifice 122 of the rear inlet distributor 12.

The third orifice 123 of the rear inlet distributor 12 is connected firstly to the first orifice 101 of the first brake distributor 10, and secondly to the first orifice 111 of the second brake distributor 11.

The second pressure accumulation means 3 that is also typically an accumulator is connected to the second orifice 132 of the front inlet distributor 13.

The third orifice 133 of this front inlet distributor 13 is connected to the third orifice of the first brake distributor 10.

The fifth orifice 105 of the first brake distributor 10 is connected to the third orifice 113 of the second brake distributor 11, and the fifth orifice 115 of the second brake distributor 11 is connected to the front braking means 6.

The fourth orifice 104 of the first brake distributor 10 is connected to the right rear brake 4, and the fourth orifice 114 of the second brake distributor 11 is connected to the left rear brake 5.

The fourth orifice 104 of the first brake distributor 10 and the fourth orifice 114 of the second brake distributor 11 are also each connected to one input of the same selection valve 40.

This selection valve 40 has an output that is connected to a first input of a shuttle valve 42, the other input of this shuttle valve 42 being connected to the fifth orifice 115 of the second brake distributor 11, and therefore to the front braking means 6.

This shuttle valve 42 has an output that is connected to the auxiliary braking means 7, and the pressure plug 8.

The selection valve 40 will select only the lowest pressure between:
 the pressure at the fourth orifice 104 of the first brake distributor 10 (and therefore also the pressure at the right rear braking means 4), and
 the pressure at the fourth orifice 114 of the second brake distributor 11 (and therefore also the pressure at the left rear braking means 5).

Therefore, the lower of these two pressures will be output from the selection valve 40 to the shuttle valve 42.

The shuttle valve 42 selects the highest pressure among:
 the output pressure from the selection valve 40, and
 the pressure at the fifth orifice 115 of the second brake distributor 11 (and therefore also the pressure at the front braking means 6).

Therefore, the highest of these two pressures will be output from the shuttle valve 42, to supply the auxiliary braking means 7 and the pressure plug 8.

The orifices for which the connection is not described are connected to a reservoir at zero pressure 50, also called an atmospheric pressure reservoir.

More precisely, in the hydraulic circuit as shown in FIG. 1, the following orifices are connected to the zero pressure reservoir 50:
the second orifice 102 of the first brake distributor 10,
the second orifice 112 of the second brake distributor 11,
the first orifice 121 of the rear inlet distributor 12,
the first orifice 131 of the front inlet distributor 13.

In the standby configuration of the hydraulic system 1 as shown in FIG. 1, the rear braking means 4 and 5 and the front braking means 6 are not pressurised; they are all connected to the atmospheric pressure reservoir 50.

The auxiliary braking means 7 are also connected to the atmospheric pressure reservoir 50.

The first and second pressure supply means 2 and 3 are connected to closed orifices, the second orifice 122 of the rear inlet distributor 12, and the second orifice 132 of the front inlet distributor 13 respectively.

Thus, no braking action is applied in this configuration.

FIGS. 2 and 3 show the hydraulic system that has already been presented in FIG. 1, in a first braking configuration and in a second braking configuration respectively.

In the first braking configuration as shown in FIG. 2, the controls 30 and 32 are activated, which typically occurs when the user presses on the vehicle right brake pedal.

The first brake distributor 10, the rear inlet distributor 12 and the front inlet distributor 12 are in, the braking position, while the second brake distributor 11 is in the standby position.

In this configuration, the first pressure supply means 2 applies pressure to the right rear brake 4 through the rear inlet distributor 12 and the first brake distributor 10.

The left rear braking means 5 and the front braking means 6 are connected to the atmospheric pressure reservoir 50 through the second brake distributor 11.

Therefore, the auxiliary braking means 7 is also connected to the atmospheric pressure reservoir 50, the selection valve 40 selecting the lowest pressure between the pressure of the right rear braking means 4 and the left rear braking means 5.

Thus in this configuration, only the right rear brake 4 is applied.

In the second braking configuration as shown in FIG. 3, the controls 31 and 32 are active, which typically occurs when the user applies pressure on the vehicle left brake pedal.

In this configuration, the left rear braking means 5 is pressurised by the first pressure supply means 2 through the rear inlet distributor 12 and the second brake distributor 11.

Thus, in the first or second pressure configuration, the right rear braking means 4 or left rear braking means 5 are each supplied by the same pressure supply means 2; the result is that the braking pressures at the rear braking means 4 and 5 are identical in these two configurations.

The right rear braking means 4 and the front braking means 6 are connected to the atmospheric pressure reservoir 50 through the first brake distributor 10.

Therefore the auxiliary braking means 7 is also connected to the atmospheric pressure reservoir 50, the selection valve 40 selecting the lowest pressure between the right rear braking means 4 and the left rear braking means 5.

Thus in this configuration, only the left rear braking means 5 is applied.

In these two braking configuration, only one of the rear braking means 4 or 5 is applied, this rear brake in both cases being pressurised by the first pressure supply means 2.

FIG. 4 shows the hydraulic system 1 in a third braking configuration.

In this configuration, the three commands 30, 31 and 32 are active, which occurs when pressure is applied on the two brake pedals simultaneously.

The first brake distributor 10, the second brake distributor 11, the rear inlet distributor 12 and the front inlet distributor 13 are in the braking position.

The right rear braking means 4 is then pressurised by the first pressure supply means 2 through the rear inlet distributor 12 and the first brake distributor 10.

The left rear braking means 5 is pressurised by the first pressure supply means 2 through the rear inlet distributor 12 and the second brake distributor 11.

The front braking means 6 are pressurised by the second pressure supply means 3 through the rear inlet distributor 13, the first brake distributor 10 and the second brake distributor 11.

Only this specific configuration of the distributors enables pressure supply to the front braking means 6. The hydraulic fluid output by the second pressure supply means must necessarily pass through the first and second brake distributor 10 and 11 to supply pressure to the front braking means 6.

The selection valve 40 then selects the lowest pressure between the pressure at the right rear braking means 4 and the left rear braking means 5, and the shuttle valve 42 then selects the highest pressure between the pressure output from the selection valve 40 and the pressure at the front braking means 6, to pressurise the auxiliary braking means 7 and the pressure plug 8.

The auxiliary braking means 7 are thus adapted to apply braking at least equal to the braking applied by the front braking means 6, which for example in the case in which the auxiliary braking means consist of the braking means of a trailer hitched to a farm vehicle equipped with a braking system according to the invention, to prevent this trailer from tipping over.

The hydraulic braking system presented thus allows a user to obtain braking adapted to working conditions (for example on a construction site or in a field), by pressing only one of the two brake pedals, or braking adapted to traffic conditions on a road at high speed by pressing simultaneously on the two brake pedals, the changeover from one of these braking configurations to the other being made without any specific action by the user apart from pressing on the brake pedals.

Furthermore, if one of the pressure supply means 2 or 3 should fail, the vehicle's braking means will remain applied when the three controls 30, 31 and 32 are activated:
if the second pressure supply means 3 should fail, the rear braking means 4 and 5 and the auxiliary braking means 7 are always pressurised; in this case only the front braking means 6 are defective.
if the first pressure supply means 2 should fail, the front braking means 6 and the auxiliary braking means 7 are always pressurised; in this case only the rear braking means 4 and 5 are defective. The hydraulic connection 15 between the distributors 12 and 13 is not pressurised, but the mechanical connection 14 moves the distributor 13 into its braking position, thus maintaining the supply to the front braking means 6 and the auxiliary braking means 7.

Putting the distributors 10, 11, 12 and 13 into the closed position puts the hydraulic system 1 into a configuration in which all the orifices are closed, which is a useful possibility particularly when components of the hydraulic circuit 1 are being replaced.

The invention claimed is:

1. Hydraulic braking system (1) for a vehicle comprising a front axle and a rear axle, said hydraulic braking system (1) comprising:
   a first (2) and a second (3) pressure supply means,
   braking means comprising:
      a first rear axle braking means(4),
      a second rear axle braking means(5),
      a front axle braking means(6),
   said hydraulic braking system (1) being characterised in that the hydraulic braking system (1) comprises a rear inlet distributor (12), a front inlet distributor (13), a first brake distributor (10) and a second brake distributor (11), defining
      a standby configuration, in which there is no supply to any of the braking means;
      a first braking configuration, in which the first supply means applies pressure to the first rear axle braking means(4);
      a second braking configuration in which the first supply means applies pressure to the second rear axle braking means (5);
      a third braking configuration in which the first supply means applies pressure to the first and second rear axle braking means (4, 5), and the second supply means applies pressure to the front axle braking means (6),
   the pressure in the front axle braking means (6) being applied by the second pressure supply means (3) through the front inlet distributor (13), the first brake distributor (10) and the second brake distributor (11),
   characterised in that said front inlet distributor (13) is slaved in displacement relative to the displacement of the rear inlet distributor (12) through mechanical (14) and hydraulic (15) connection means, and in that
   said hydraulic means (15) includes a slaving line supplied with pressure through a conduit (16) connected to the rear supply distributor (12), and
   said mechanical connection means (14) comprises a thrust rod adapted so that the mechanical connection means (14) only moves the front inlet distributor (13) if the hydraulic connection means (15) is defective.

2. Hydraulic braking system according to the previous claim, said hydraulic braking system being characterised in that the hydraulic braking system (1) comprises two brake pedals (33, 34) that are pressed by a user applying pressure, and when no pressure is applied to the brake pedals (33, 34) the hydraulic braking system (1) occupies the standby configuration, wherein the first braking configuration is triggered by applying pressure on one of said brake pedals (33 or 34), the second braking configuration is triggered by applying pressure on the other of said brake pedals (33 or 34), and the third braking configuration is triggered by simultaneously applying pressure on the two brake pedals (33 and 34).

3. Hydraulic braking system (1) according to one of the previous claims, characterised in that in the third braking configuration of said hydraulic braking system (1), one of the first (2) or second (3) pressure supply means applies pressure to an auxiliary braking means (7).

4. Hydraulic braking system (1) according to claim 1, in which only the means with the highest pressure among the first and second pressure supply means (2, 3) applies pressure to the auxiliary braking means (7), such that the braking pressure of the auxiliary braking means (7) is greater than or equal to the braking pressure of the front axle braking means (6).

5. Hydraulic braking system (1) according to claim 1, characterised in that each of said first and second pressure supply means (2, 3) comprises at least one accumulator.

6. Hydraulic braking system (1) according to claim 1, in which:
   the rear inlet distributor (12) comprises:
      an input (122) of the rear inlet distributor (12) connected to the first pressure supply means (2), and
      an output (123) of the rear inlet distributor (12) connected to the first and second brake distributors (11);
   the front inlet distributor (13) comprises:
      an input (132) of the front inlet distributor (13) connected to the second pressure supply means (3), and
      an output (133) of the front inlet distributor (13) connected to the first brake distributor (10);
   the first brake distributor (10) comprises:
      a first input (101) of the first brake distributor (10) connected to the output (123) of the rear inlet distributor (12),
      a second input (103) of the first brake distributor (10) connected to the output (133) of the front inlet distributor (13),
      a first output (104) of the first brake distributor (10) connected to the first rear axle braking means (4),
      a second output (105) of the first brake distributor (10) connected to the second brake distributor(11);
   the second brake distributor (11) comprises:
      a first input (111) of the second brake distributor (11) connected to the output (123) of the rear inlet distributor (12),
      a second input (113) of the second brake distributor (11) connected to the second output (105) of the first brake distributor (10),
      a first output (114) of the second brake distributor (11) connected to the second rear axle braking means (5),
      a second output (115) of the second brake distributor (11) connected to the front axle braking means (6).

7. Hydraulic braking system (1) according to claim 6 characterised in that each of said rear inlet distributor (12), front inlet distributor (13), first brake distributor (10), and second brake distributor (11) has a cut-out position in which each output of the front and read inlet distributors (123, 133) and each first and second output (104, 105, 114, 115) is connected to a reservoir at atmospheric pressure (50) and each input of the front and read inlet distributors (122, 132) and each first and second input (101, 103, 111, 113) is closed, and a cut-in position in which:
   the input (122) of the rear inlet distributor (12) is connected to the output (123) of the rear inlet distributor (12);
   the input (132) of the front inlet distributor (13) is connected to the output (133) of the front inlet distributor (13);
   the first input (101) of the first brake distributor (10) is connected to the first output (104) of the first brake distributor (10) and the second input (103) of the first brake distributor (10) is connected to the second output (105) of the first brake distributor (10);
   the first input (111) of the second brake distributor (11) is connected to the first output (114) of the second brake distributor (11) and the second input (113) of the second brake distributor (11) is connected to the second output (115) of the second brake distributor (11).

8. Hydraulic braking system (1) according to claim 7, characterised in that:

in the standby configuration of the hydraulic braking system (1), each of said distributors (10, 11, 12, 13) is in the cut-out position;

in the first braking configuration of the hydraulic braking system (1), the rear inlet distributor (12), the front inlet distributor (13) and the first brake distributor (10) are in the cut-in position, while the second brake distributor (11) is in the cut-out position;

in the second braking configuration of the hydraulic braking system (1), the rear inlet distributor (12), the front inlet distributor (13) and the second brake distributor (11) are in the cut-in position, while the first brake distributor (10) is in the cut-out position;

in the third braking configuration of the hydraulic braking system (1), the rear inlet distributor (12), the front inlet distributor (13), the first brake distributor (10) and the second brake distributor (11) are in the cut-in position.

\* \* \* \* \*

UNITED STATES PATENT AND TRADEMARK OFFICE
CERTIFICATE OF CORRECTION

PATENT NO. : 8,684,472 B2  
APPLICATION NO. : 13/231828  
DATED : April 1, 2014  
INVENTOR(S) : Jean A. Heren et al.

Page 1 of 1

It is certified that error appears in the above-identified patent and that said Letters Patent is hereby corrected as shown below:

In the Claims

Column 10, Claim 7, line 48, please delete "read" and insert --rear--.

Signed and Sealed this
Fourteenth Day of October, 2014

Michelle K. Lee
*Deputy Director of the United States Patent and Trademark Office*